(12) United States Patent
Feichter

(10) Patent No.: US 7,666,102 B2
(45) Date of Patent: Feb. 23, 2010

(54) BALL CAGE FOR A CONSTANT VELOCITY UNIVERSAL JOINT AND PROCESS OF PRODUCING SAME

(75) Inventor: Bruno Feichter, Bruneck/Reischach (IT)

(73) Assignee: GKN Driveline Bruneck AG, Bruneck (IT)

( * ) Notice: Subject to any disclaimer, the term of this patent is extended or adjusted under 35 U.S.C. 154(b) by 286 days.

(21) Appl. No.: 11/516,240

(22) Filed: Sep. 6, 2006

(65) Prior Publication Data

US 2007/0060399 A1 Mar. 15, 2007

(30) Foreign Application Priority Data

Sep. 8, 2005 (IT) .......................... MI2005A1656
Dec. 14, 2005 (DE) ...................... 10 2005 059 696

(51) Int. Cl.
*F16D 3/227* (2006.01)
(52) U.S. Cl. ...................................... 464/146; 464/906
(58) Field of Classification Search ................ 464/140, 464/145, 146, 906; 29/898.067, 898.04, 29/898.041, 898.042, 898.043, 898.056, 29/898.06, 898.065, 557, 558
See application file for complete search history.

(56) References Cited

U.S. PATENT DOCUMENTS

| 3,815,381 | A | * | 6/1974 | Wagner | 464/146 |
| 3,935,717 | A | * | 2/1976 | Welschof | 464/145 |
| 4,385,899 | A | * | 5/1983 | Franklin, Jr. | 464/146 |
| 4,878,882 | A | * | 11/1989 | Welschof et al. | 464/906 |
| 5,410,902 | A | * | 5/1995 | Jacob | 464/145 |
| 5,853,328 | A | * | 12/1998 | Kobayashi et al. | 464/145 |
| 6,299,543 | B1 | | 10/2001 | Sone | |
| 6,299,544 | B1 | | 10/2001 | Schwarzler et al. | |

FOREIGN PATENT DOCUMENTS

DE 2 114 536 7/1972

OTHER PUBLICATIONS http://www.thewarren.org/ALevelRevision/engineering/grainstructure.htm (4 pages).
Article from Manufacturing Engineering, Feb. 2009, vol. 142, No. 2 entitled Converting Machining Applications to Grinding (6 pages).

* cited by examiner

*Primary Examiner*—Greg Binda
(74) *Attorney, Agent, or Firm*—Rader, Fishman & Grauer PLLC

(57) ABSTRACT

A ball cage for a constant velocity plunging joint which having an outer joint part with a internally cylindrical guiding face and an inner joint part with an outer spherical guiding face and torque transmitting balls held in the ball cage. The ball cage includes a plurality of circumferentially distributed windows (3) for receiving the torque transmitting balls, and defining a central window plane (M); an outer free face (10) and an outer spherical control face (9) for guiding the ball cage relative to the outer joint part; and an inner spherical control face (16) for guiding the ball cage relative to the inner joint part. The center of the outer spherical control face (9) and the center of the inner spherical control face (16) are positioned at an axial distance from the central window plane (M). The outer spherical (9) is hard-machined and the outer free face (10) is soft-machined.

12 Claims, 3 Drawing Sheets

BALL CAGE FOR A CONSTANT VELOCITY UNIVERSAL JOINT AND PROCESS OF PRODUCING SAME

TECHNICAL FIELD

The invention relates to a ball cage for a constant velocity universal joint, more particularly for a constant velocity plunging joint in the form of a double offset joint. The invention further relates to a process of producing such a ball cage and a constant velocity universal joint with such a ball cage.

BACKGROUND OF THE INVENTION

Constant velocity plunging joints are well known from the state of the art and comprise an outer joint part with a plurality of circumferentially distributed, longitudinally extending outer tracks, an inner joint part with a plurality of circumferentially distributed, longitudinally extending inner tracks, torque transmitting balls which are each guided in a pair of tracks consisting of an outer track and an inner track, as well as a ball cage with circumferentially distributed windows for receiving the balls. When the joint is articulated, the balls, in cooperation with the tracks and the ball cage, are set to the angle-bisecting plane.

From U.S. Pat. No. 6,299,544, there is known a constant velocity plunging joint in the form of a double offset joint type with centering means for the ball cage. The ball cage comprises an outer spherical control face whose greatest diameter is positioned at an axial distance from the joint center plane; the ball cage also comprises an inner concave control face whose greatest diameter is positioned in the opposite direction at an axial distance from the joint center plane. The outer spherical control face is tangentially adjoined by a conical face.

U.S. Pat. No. 6,299,543 shows a further constant velocity plunging joint in the form of a double offset joint which is designed similarly. On its outside, in the region of the windows, the ball cage comprises projections which radially project from the conical guiding face, for guiding the associated ball when the joint is in an articulated position.

DE 2 114 536 proposes a constant velocity plunging joint wherein an externally spherical control member is slid on to the inner joint part and is axially displaceable relative thereto. The ball cage is pivotably supported on the control member. The ball cage is designed asymmetrically relative to the central window plane.

Despite these prior joint designs, there still exists a need for further improvements in such joints in terms of weight, manufacturability and cost. The present invention is directed towards such improvements.

SUMMARY OF THE INVENTION

The present invention provides an improved ball cage for a constant velocity universal joint as well as a process of producing such a ball cage; the ball cage is easy and cost-effective to produce and it is lightweight. An improved constant velocity universal joint with such a ball cage is also provided.

A first solution provides a ball cage for a constant velocity universal joint, more particularly for a constant velocity plunging joint which comprises an outer joint part with an internally cylindrical guiding face and an inner joint part with an outer spherical guiding face and torque transmitting balls held in the ball cage. The ball cage has the following characteristics: a plurality of circumferentially distributed windows for receiving the torque transmitting balls, wherein the windows, jointly, define a central window plane; an outer spherical control face for guiding the ball cage relative to the outer joint part, as well as an outer free face; and an inner spherical control face for guiding the ball cage relative to the inner joint part; wherein the center of the outer spherical control face and the center of the inner spherical control face are positioned at an axial distance from the central window plane; wherein the outer spherical control face is hard-machined and the outer free face is soft-machined. The term free face means that it is not intended to be a contacting face with respect to the outer joint part.

Soft machining is intended to mean a machining operation carried out prior to the ball cage being hardened, whereas hard machining refers to a machining operation carried out after hardening. The machining operations are preferably of the chip-forming type, such as a turning operation. Because the outer spherical control face is hard-machined and the outer free face soft-machined, the total machining time needed for the production of the ball cage is shortened. A further advantage of the inventive ball cage is that the spherical face constitutes only part of the outer face, so that the face to be cut is reduced in size, with tool wear during hard machining being minimized. The inventive ball cage is particularly suitable for those constant velocity universal joints wherein the ball cage is provided with a primary functional face with a control function and a secondary face without a working function, offset therefrom. Such joints are typically plunging joints, for example double offset plunging joints with parallel ball tracks or VL plunging joints with crossed ball tracks. However, in principle, the inventive ball cage can also be used in fixed joints wherein, at the ball cage, a functional face and a secondary face without any working function, i.e., free face, are separated. In this case, too, the above-mentioned advantages of a shortened production time and a longer tool life are provided, with production being all the more cost-effective, the larger the secondary face.

According to another embodiment, the distance between the central window plane and a first end face is less than the distance between the central window plane and a second end face pointing in the direction opposite to that of the first end face. This is advantageous because it results in material savings, which has a favorable effect on the weight and production costs of the ball cage. Furthermore, while the plunging distance requirements for the double offset plunging joint in which the inventive ball cage is used remain the same, the axial length of the outer joint part can be reduced. This leads to weight savings and reduced production times with the outer joint part as well.

According to a further embodiment, there is provided, axially, between the free face and the outer spherical face, a circumferential recess as a tool run-out. The recess is arranged axially in the region of the greatest inner diameter of the inner spherical control face. The recess forms a run-out for a turning tool or a grinding tool when hard-machining the spherical control face. The recess can comprise a base which axially changes into the free face, i.e. adjoins same.

In another embodiment, the outer free face is aligned tangentially relative to the outer spherical control face or it is aligned parallel and inside to a tangent adjoining the outer spherical free face. Furthermore, it is advantageous if the free face has a conical shape in order to permit an articulation of the inner joint part relative to the outer joint part up to the maximum angle of articulation. The cone angle approximately corresponds to half the maximum articulation angle of the constant velocity plunging joint.

According to yet another embodiment, an outer circumferentially extending raised portion is provided between the free face and the recess. The raised portion is aligned tangentially relative to the outer spherical control face and positioned axially in the region of a plane defined by side faces of the windows. The raised portion widens the side face of the window radially outwardly and thus serves to guide the balls when the joint is articulated. If a raised portion is provided, the base of the recess can change axially seamlessly into the raised portion, i.e. it can adjoin the raised portion in a non-stepped manner.

According to an advantageous further embodiment, the ball cage, in the region adjoining the inner spherical control face, comprises an undercut-free widening face, which increases in size towards the aperture. The widening face constitutes a secondary face which, in the built-in condition, does not have any functions in terms of contact and therefore preferably remains unmachined. The widening face preferably comprises a cylindrical portion which starts from the aperture of the ball cage and which, arch-like, changes into an inwardly projecting connecting portion which, in turn, is followed by the inner spherical control face. The widening face fulfils the function of permitting axially fitting of the inner joint part during joint assembly.

A second solution provides a process of producing a ball cage for a constant velocity universal joint, more particularly for a constant velocity plunging joint which comprises an outer joint part with an internally cylindrical guiding face and an inner joint part with an outer spherical guiding face and torque transmitting balls held in the ball cage, comprising the following process stages: providing a pre-formed annular blank with an outer face, an inner face, a first end face and a second end face, wherein the outer face comprises a spherical face and a conical face; soft-machining the conical face for producing a conical free face, wherein the spherical face initially remains unmachined; hardening the soft-machined ball cage; hard-machining the spherical face for producing a control face, wherein the free face remains unmachined.

The ball cage produced in accordance with the invention comprises the above-mentioned advantages of a quick and cost-effective production, with the tool life being prolonged due to the fact that only the outer spherical control face is hard-machined, whereas the secondary faces remain unmachined.

The inner face of the blank can comprise a mostly internally cylindrical face and a widening face adjoining same, by soft-machining of the internally cylindrical face, with there being produced a spherical inner control face. In an advantageous embodiment, the widening face remains unmachined. The blank, in the form of a tool run-out, can comprise a continuous recess between the spherical face and the conical face. The recess can be machined simultaneously with the soft-machining of the conical face, provided this is necessary because of the production tolerances.

According to another embodiment, the internally cylindrical face of the blank comprises circumferentially distributed keyways which run into the widening face. The keyways are provided in the circumferential direction in those regions where—in the finish-machined condition of the ball cage—the windows are intended to be located. The widening face and the keyways aligned relative to the windows permit an axial assembly of the inner joint part. Furthermore, by providing the keyways, material is saved in the region of the windows, which material would otherwise need to be removed for the production of windows. This also has an advantageous effect on the production times and tool life.

A further process stage can also be provided prior to the hardening operation: soft-machining of the second end face delimiting the free face for the purpose of producing a second end face, wherein the first end face remains unmachined and forms the first end face. This results in one machining operation being eliminated; more particularly, there is no need for the ball cage to be clamped for the purpose of machining the first end face.

A further process stage can also be provided prior to the hardening operation: working in a plurality of circumferentially distributed windows for receiving torque transmitting balls, wherein the windows jointly define a central window plane, wherein a first cage portion formed between the central window plane and the first end face is axially shorter than a second cage portion formed between the central window plane and the second end face. This results in the above-mentioned advantage of a low ball cage weight. It is advantageous to produce the windows by milling.

The soft machining process stages should be turning operations which can all be carried out in one clamping tool. The hard machining operation can be a turning or a grinding operation.

A further solution provides a constant velocity universal joint, more particularly a constant velocity plunging joint comprising: an outer joint part with an inner guiding face in which there are formed outer tracks; an inner joint part with an outer convex guiding face in which there are formed inner tracks; torque transmitting balls which run in ball tracks each formed by an outer track and an inner track; as well as a ball cage with the following characteristics: a plurality of circumferentially distributed windows for receiving the torque transmitting balls, wherein the windows, jointly, define a central window plane; an outer spherical control face for guiding the ball cage relative to the outer joint part, as well as an outer free face; and an inner spherical control face for guiding the ball cage relative to the inner joint part; wherein the center of the outer spherical control face and the center of the inner spherical control face are positioned at an axial distance from the central window plane; wherein the outer spherical control face is hard-machined and the outer free face is soft-machined.

The constant velocity universal joint can be provided in the form of a constant velocity plunging joint, and comprise an internally cylindrical guiding face at its outer joint part and a spherical guiding face at the inner joint part. The ball cage can be designed in accordance with one of the above-mentioned embodiments, as a result of which there are obtained the advantages referred to above. By arranging the central window plane asymmetrically, it is possible—while retaining the same plunging distance—to reduce the axial length of the outer joint part, which, also in the case of the outer joint part, leads to weight savings and reduced production times. Alternatively, the inventive ball cage can be used to increase the plunging distance of the constant velocity plunging joint.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

Figure 1C:
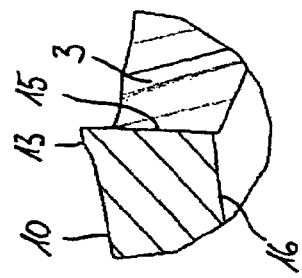
FIG. 1 shows an inventive ball cage for a double offset plunging joint.
Figure 1B:
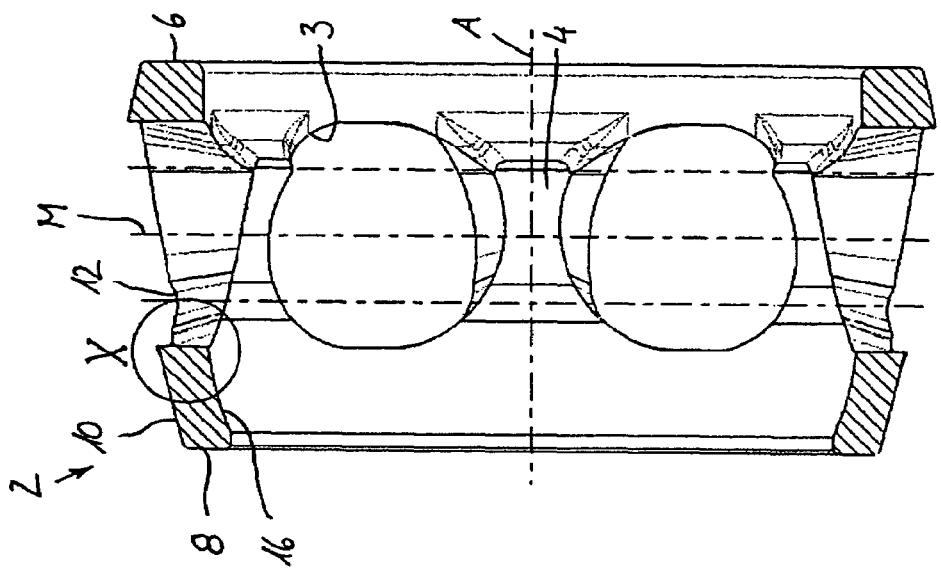

A) in a longitudinal section through two webs positioned opposite one another;

B) in a longitudinal section through two windows positioned opposite one another; and C) with the detail X of FIG. 1B.

Figure 2C:
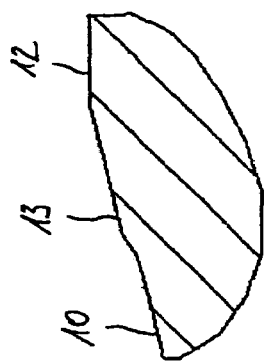
Figure 2B:
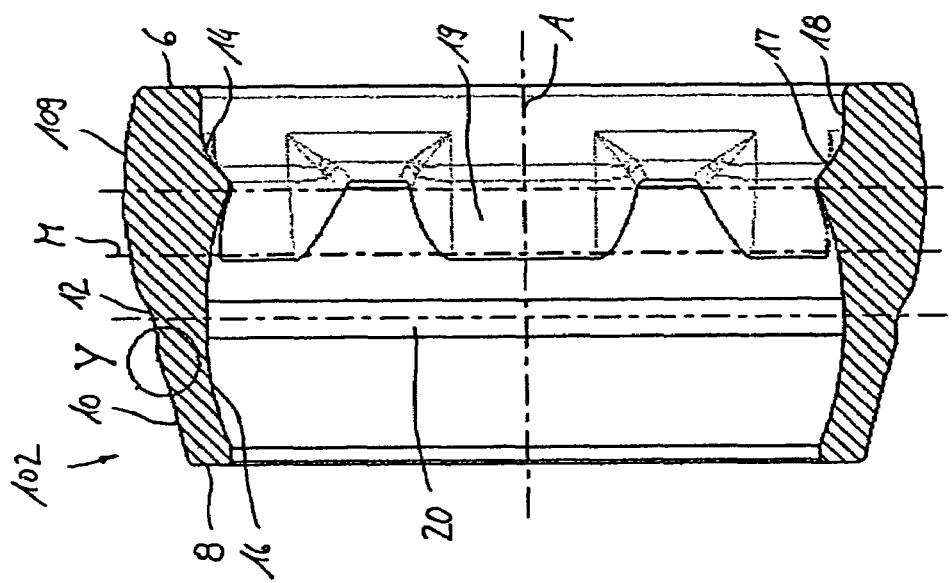

FIG. 2 shows the inventive ball cage while being produced, involving the following process stages:

A) as a blank,

B) after the turning operation;

C) with the detail Y of FIG. 2B; and

D) after the milling operation in a longitudinal section through the webs.

Figure 3:
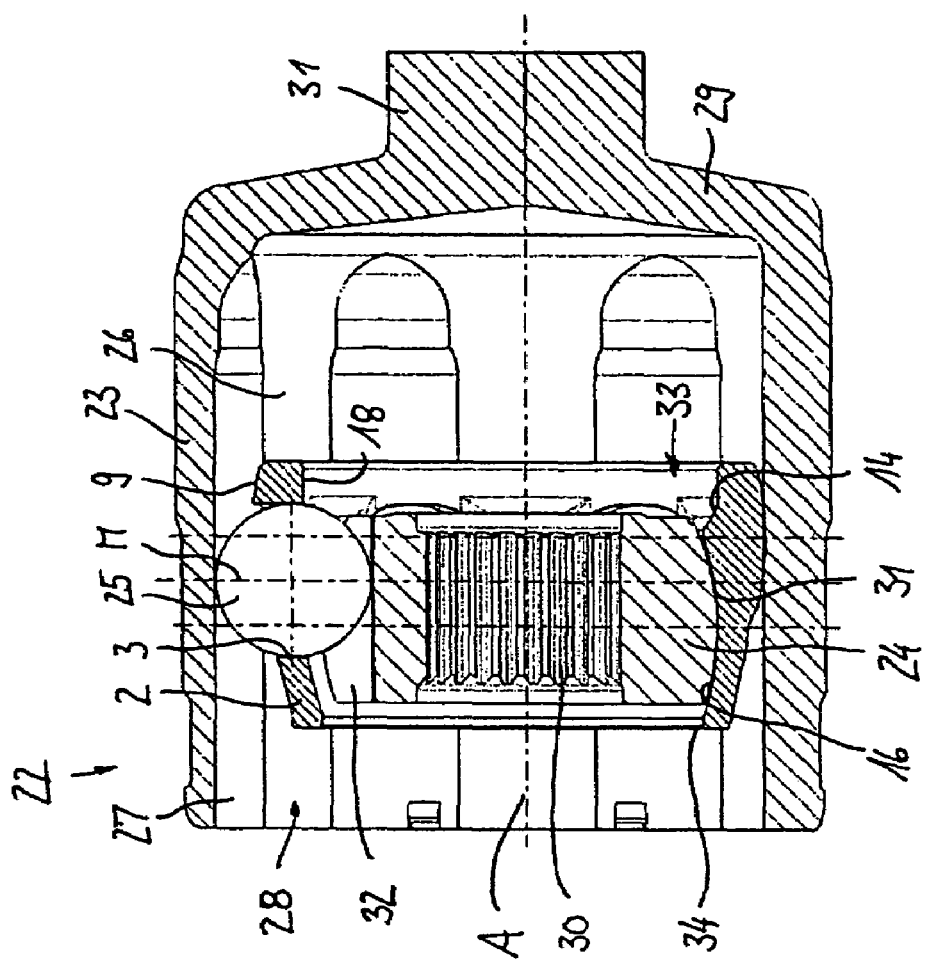

FIG. 3 shows an inventive double offset constant velocity plunging joint with an inventive ball cage.

DETAILED DESCRIPTION OF THE DRAWINGS

Figure 1A:
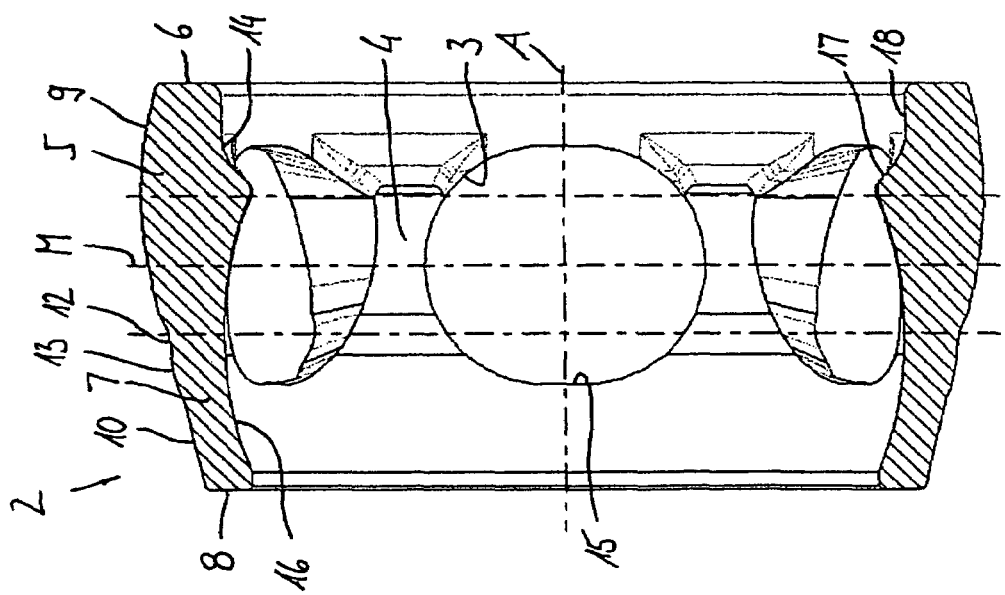

FIG. 1 shows a ball cage 2 for a constant velocity universal joint in the form of a constant velocity plunging joint. Such a joint is shown, for example, in FIG. 3. The constant velocity plunging joint 22 comprises an outer joint 23 part with an internally cylindrical guiding face 26, an inner joint part 24 with an outer spherical guiding face 31 and a ball cage 2 for receiving torque transmitting balls 25.

As shown in FIG. 1, the ball cage 2 annularly surrounds an axis of rotation A and comprises a plurality of circumferentially distributed windows 3 for receiving torque transmitting balls as well as webs 4 formed in the circumferential direction between two adjoining windows 3. The number of windows 3 depends on the number of balls to be used and is normally six or eight. The windows 3 jointly define a central window plane M in which the balls are held. The plane constitutes the angle bisecting plane between the inner joint part and the outer joint part when the joint is articulated. Furthermore, the ball cage 2 comprises a first cage portion 5 which extends between the central window plane M and a first end face 6, as well as a second cage portion 7 which extends between the central window plane and a second end face 8 extending in the direction opposed to that of the first end face 6. It can be seen that the first cage portion 5 is axially shorter than the second cage portion 7, as a result of which material can be saved. While the plunging distance requirements of the double offset joint remain the same, this leads to a reduction in the axial length of the outer joint part.

Furthermore, the ball cage 2 comprises an outer spherical control face 9 which enters directly into contact with the internally cylindrical guiding face 26 of the outer joint part and extends over the first cage portion 5 and part of the second cage portion 7. The spherical control face 9 is a face in the form of spherical portion or a similar drum-shaped face which is followed by a conical free face 10 substantially tangential to or aligned parallel to a tangent adjoining the outer spherical face respectively. The cone angle of the free face 10 approximately corresponds to half the maximum articulation angle of the constant velocity plunging joint. Between the free face 10 and the spherical control face 9, there is formed a continuous radial recess 12 which, during production, serves as a run-out for machining tools. As is particularly evident in FIG. 1C, the free face 10, in the region of the windows, runs into a continuous conical raised portion 13 which, in the region of its greatest diameter, changes seamlessly into a cylindrical base of the continuous recess 12. The conical face of the raised portion 13 is aligned tangentially relative to the outer spherical control face 9 or, inside, is aligned parallel to a tangent adjoining the outer spherical control face 9. The raised portion 13 is arranged axially in the region of a plane which is defined by the lateral guiding faces 15 of the windows 3 and which is associated with the second cage portion 5. As a result of the raised portion 13, the lateral guiding face 15 for guiding the balls when the joint is articulated is widened radially.

On its inside, the ball cage 2 forms a concave inner spherical control face 16 for guiding the ball cage 2 relative to a guiding face of the inner joint part. The inner spherical control face 16 extends over the second cage portion 7 and part of the first cage portion 5. The inner spherical control face 16 is adjoined, axially, approximately in the region of the greatest diameter of the outer spherical control face 9, by a widening face 14 which widens the cage ring towards the aperture and comprises a concave transition region 17 as well as an inner cylindrical face 18. The outer control face 9 comprises a greatest outer diameter which is positioned at the same axial distance from the central window plane M in the direction opposed to that of a greatest inner diameter of the inner control face 13. This offset of the maximum diameters of the control faces recalls the name of the joint, i.e. a double offset joint.

The individual process stages for producing the inventive ball cage 2 are described below with reference to FIG. 2. Any parts and faces identical to those shown in FIG. 1 have been given the same reference numbers, with the reference numbers of any parts and faces as yet unmachined having been increased by 100.

Figure 2A:
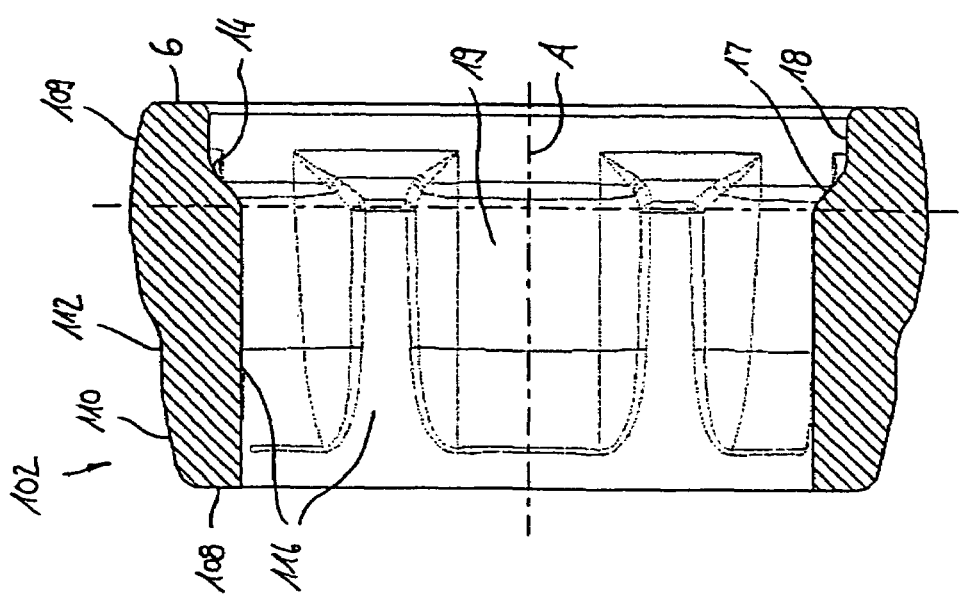

The starting point is the blank 102 which already partly comprises the contours of the finish-machined ball cage 2 and which is shown in FIG. 2A. The blank 102 is a precision blank and preformed by a bulk forming process, for example, such as forging. The blank 102 is annular in shape and comprises a first axial end face 6, a second axial end face 108 extending in the opposite direction thereto, an outer face and an inner face. The outer face, starting from the first end face 6, comprises a spherical face 109, an axially adjoining continuous recess 112 as well as a face 110 which axially adjoins said recess 112 and is preferably substantially conical. The inner face 102, starting from the first end face 6, comprises a first cylindrical face 18 with a greater inner diameter, an adjoining conical transition portion 17 and a second cylindrical face 116 with a smaller inner diameter, which adjoins the conical transition portion 17. In the region of the second cylindrical face 116, in the axial direction, there are formed in longitudinally extending keyways 19 which end in the first cylindrical face 18. The keyways 19 are circumferentially arranged in those places where the windows will be located in the finish-machined condition. In this way, material is saved in the region of the windows, which material would have to be removed in a chip-forming way in any case for producing the windows. The keyways 19 which are aligned relative to the windows, and the widening faces 14 permit axial assembly of the inner joint part.

The blank is clamped in at its end associated with the first end face 6 and then machined by being turned in a subsequent production stage. During the turning operation, the conical face 110 forming the free face 10 and the raised portion 13 are formed. In further turning operations, the end face 108 forming the end face 8, and the second cylindrical inner face 116 forming the inner spherical control face 16 are formed. The remaining faces, i.e. the spherical outer face 109, the end face 6 and the widening face 14 comprising a first cylindrical face 18 and the transition face 17 (initially) remain unmachined. FIG. 2B shows the workpiece after the turning operation, with the free face 10, the raised portion 13, the inner spherical face 16 and the second end face 8 having been worked in. It can be seen that the spherical inner face 16 is interrupted in the region of its greatest inner diameter by a cylindrical face 20. In the operating condition of the joint, the cylindrical face 20 permits the inner joint part to be axially displaced relative to the ball cage 2, so that any vibrations occurring in the driveline can be uncoupled.

The raised portion 13 which, on the one hand, adjoins the free face 10 and on the other hand adjoins the base of the recess 12, is shown in the form of a detail in FIG. 2C.

Figure 2D:
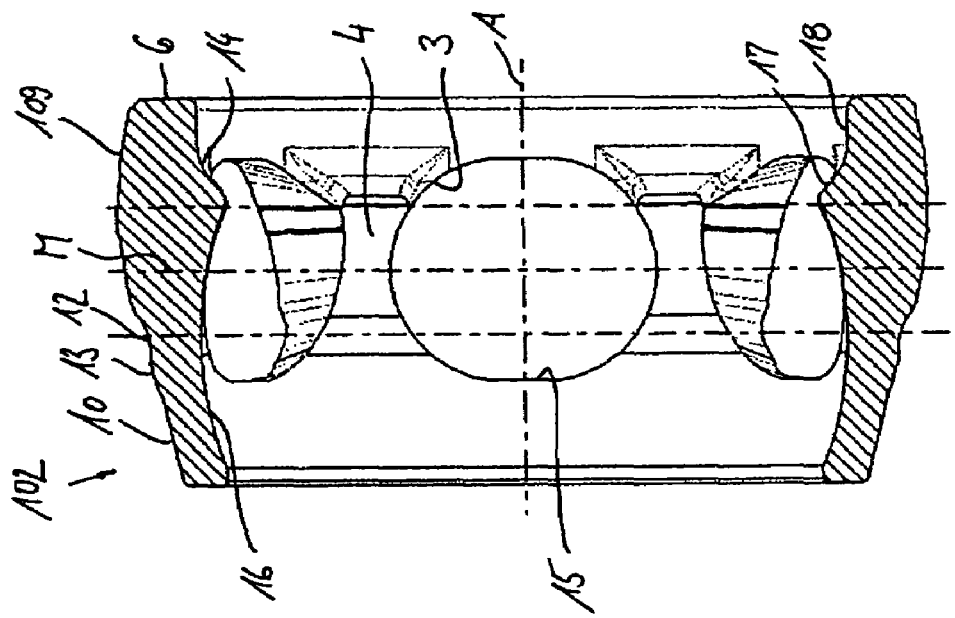

After the turning operation, the ball cage undergoes a milling operation. FIG. 2D shows the ball cage 2 after milling, with the circumferentially distributed windows 3 being visible. After having been milled, the ball cage 2 is hardened. After the hardening operation, a spherical outer face 109, which has so far remained unmachined, is hard-machined, with a suitable production process being either turning or grinding. During the hard-machining operation, the dimensional allowance provided for the spherical outer face 109 is removed by a chip-forming operation in order to produce the outer spherical control face 9. The dimensional allowance amounts to a few tenths of a millimeter. The first end face 6 and the widening face 14 remain unmachined up to this point, results in fewer production stages overall. The finish-machined ball cage 2 is shown in FIG. 1 as described above. The outer spherical control face 9 has been produced from the spherical outer face which contacts the internally cylindrical guiding face 26 of the outer joint part 23.

FIG. 3 shows an inventive constant velocity plunging joint 22 with an outer joint part 23, an inner joint part 24, an inventive ball cage 2 in the above embodiment and torque transmitting balls 25 which are each held in an associated window of the ball cage 2 in a common plane M. The outer joint part 23 comprises an internally cylindrical guiding face 26 with which the spherical control face 9 of the ball cage 2 is in contact and guided therein. Furthermore, the outer joint part 23 comprises a plurality of circumferentially distributed, longitudinally extending outer tracks 27 which extend over a substantial part of the outer joint part 23 as far as the open end 28. At the end which is opposed to the open end 28, the outer joint part 23 is closed in a bell-like way and comprises a base 29 with a formed-on journal 31 which serves torque transmitting purposes. The inner joint part 24 comprises a bore with longitudinal teeth 30 into which it is possible to insert a shaft journal (not shown) via corresponding counter teeth for torque transmitting purposes. Furthermore, the inner joint part comprises a spherical outer face 31 which is in contact with the spherical inner face 16 of the ball cage 2 with circumferentially distributed, longitudinally extending inner tracks 32. Each of the torque transmitting balls 25 is guided in a pair of tracks comprised of inner tracks 32 and outer tracks 27. The first cylindrical face 18 of the ball cage 2 forms a greater inner aperture 33 which is directed towards the base 29 of the outer joint part 23 and whose diameter, for assembly purposes, is greater than the outer diameter of the inner joint part 24. At the opposite end, the ball cage 2 comprises a smaller inner aperture 34 whose diameter is smaller than the outer diameter of the inner joint part 24 and thus forms an axial stop. As a result of the inventive ball cage 2, the outer joint part has a relatively short axial length, which leads to weight savings and a reduced production time.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A ball cage for a constant velocity plunging joint, the ball cage comprising:

an outer spherical control face for guiding the ball cage relative to an outer joint part of the constant velocity plunging joint, and outer free face;

a plurality of circumferentially distributed windows for receiving torque transmitting balls, wherein the windows, jointly, define a central window plane (M), wherein a distance between the central window plane (M) and a first end face which de-limits the ball cage on a side of the spherical control face is less than a distance between the central window plane (M) and a second end face which delimits the ball cage on a side of the outer free face;

and an inner spherical control face for guiding the ball cage relative to an inner joint part of the constant velocity plunging joint;

wherein a center of the outer spherical control face and a center of the inner spherical control face are positioned at an axial distance from the central window plane, and wherein the outer spherical control face is hard-machined and the outer free face is soft-machined;

wherein the first end face is unmachined and the second end face is machined, starting from a pre-formed annular blank; and wherein the outer free face extends from the second end face of the ball cage and ends before a plane defined by side faces of the windows, where the side faces are arranged proximate to the second end face.

2. A ball cage according to claim 1, comprising, in the axial direction, a circumferential recess for use as a tool run-out between the free face and the outer spherical control face.

3. A ball cage according to claim 2, comprising a circumferentially extending raised portion which extends tangentially relative to the outer spherical control face and which, axially, is positioned in a region of a plane defined by side faces of the windows.

4. A ball cage according to claim 3, wherein the recess comprises a base which axially changes into the raised portion and the free face, respectively.

5. A ball cage according to claim 1, wherein the free face extends parallel to a tangent which adjoins the outer spherical control face.

6. A ball cage according to claim 5, comprising a circumferentially extending raised portion between the free face and a circumferential recess between the free face and the outer spherical control face, the raised portion extending tangentially relative to the outer spherical control face and which, axially, is positioned in a region of a plane defined by side faces of the windows.

7. A ball cage according to claim 1, comprising, in the region adjoining the inner spherical control face, an undercut-free widening face.

8. A constant velocity plunging joint comprising:

an outer joint part with an internally cylindrical guiding face in which there are formed outer tracks;

an inner joint part with an outer convex guiding face in which there are formed longitudinally extending inner tracks;

torque transmitting balls which run in ball tracks each formed by an outer track and an inner track; and a ball cage comprising:

an outer spherical control face for guiding the ball cage relative to the outer joint part, as well as an outer free face;

a plurality of circumferentially distributed windows for receiving the torque transmitting balls, wherein the windows, jointly, define a central window plane (M), wherein a distance between the central window plane (M) and a first end face which de-limits the ball cage on a side of the spherical control face is less than a distance between the central window plane (M) and a second end face which delimits the ball cage on a side of the outer free face; and an inner spherical control face for guiding the ball cage relative to the inner joint part;

wherein the center of the outer spherical control face and the center of the inner spherical control face are positioned at an axial distance from the central window plane (M);

wherein the outer spherical control face is hard-machined and the outer free face is soft-machined;

wherein the first end face is unmachined and the second end face is machined, starting from a pre-formed annular blank; and wherein the outer free face extends from the second end face of the ball cage and ends before a plane defined by side faces of the windows, where the side faces are arranged proximate to the second end face.

9. A ball cage made from a pre-formed annular blank for a constant velocity plunging joint comprising an outer joint part with an internally cylindrical guiding face, an inner joint part with an outer spherical guiding face and torque transmitting balls held in the ball cage, the ball cage comprising:

an outer spherical control face for guiding the ball cage relative to the outer joint part, and an outer free face;

a plurality of circumferentially distributed windows for receiving the torque transmitting balls, wherein the windows, jointly, define a central window plane (M), wherein a distance between the central window plane (M) and a first end face which de-limits the ball cage on a side of the spherical control face is less than a distance between the central window plane (M) and a second end face which delimits the ball cage on a side of the outer free face; and an inner spherical control face for guiding the ball cage relative to the inner joint part;

wherein a center of the outer spherical control face and a center of the inner spherical control face are positioned at an axial distance from the central window plane, wherein the outer spherical control face is hard-machined and wherein the outer free face is un-machined, staffing from said pre-formed annular blank;

wherein the first end face is unmachined and the second end face is machined, staffing from said pre-formed annular blank; and wherein the outer free face extends from the second end face of the ball cage and ends before a plane defined by side faces of the windows, where the side faces are arranged proximate to the second end face.

10. A ball cage according to claim 9, wherein the ball cage comprises an inner widening face which is unmachined, starting from said pre-formed annular blank.

11. A ball cage according to claim 9, wherein the inner spherical control face is hard-machined by the means of a turning operation or grinding operation.

12. A constant velocity plunging joint comprising:

a ball cage made from a pre-formed annular blank;

an outer joint part with an internally cylindrical guiding face; and an inner joint part with an outer spherical guiding face and torque transmitting balls held in the ball cage;

wherein the ball cage comprises:

an outer spherical control face for guiding the ball cage relative to the outer joint part, and an outer free face;

a plurality of circumferentially distributed windows for receiving the torque transmitting balls, wherein the windows, jointly, define a central window plane (M), wherein a distance between the central window plane (M) and a first end face which de-limits the ball cage on a side of the spherical control face is less than a distance between the central window plane (M) and a second end face which delimits the ball cage on a side of the outer free face; and an inner spherical control face for guiding the ball cage relative to the inner joint part;

wherein a center of the outer spherical control face mad a center of the inner spherical control face are positioned at an axial distance from the central window plane, wherein the outer spherical control face is hard-machined and wherein the outer free face is un-machined, staffing from said pre-formed annular blank;

wherein the first end face is unmachined and the second end face is machined, staffing from said pre-formed annular blank; and wherein the outer free face extends from the second end face of the ball cage and ends before a plane defined by side faces of the windows, where the side faces are arranged proximate to the second end face.

* * * * *

UNITED STATES PATENT AND TRADEMARK OFFICE
CERTIFICATE OF CORRECTION

| | | |
|---|---|---|
| PATENT NO. | : 7,666,102 B2 | Page 1 of 1 |
| APPLICATION NO. | : 11/516240 | |
| DATED | : February 23, 2010 | |
| INVENTOR(S) | : Bruno Feichter | |

It is certified that error appears in the above-identified patent and that said Letters Patent is hereby corrected as shown below:

Title Page:

Item [30], Foreign Application Priority Data from "(DE) 10 2005 059 696" change to --(DE) 10 2005 059 696.7--

In the Claims:

Claim 1, Column 8, line 3, change "and outer" to --and an outer--

Claim 9, Column 9, line 44, change "staffing" to --starting--

Claim 9, Column 9, line 46, change "staffing" to --starting--

Claim 12, Column 10, line 32, change "mad" to --and--

Claim 12, Column 10, line 38, change "staffing" to --starting--

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,666,102 B2 | Page 1 of 1 |
| APPLICATION NO. | : 11/516240 | |
| DATED | : February 23, 2010 | |
| INVENTOR(S) | : Bruno Feichter | |

It is certified that error appears in the above-identified patent and that said Letters Patent is hereby corrected as shown below:

Claim 12, Column 10, line 40, change "staffing" to --starting--

Signed and Sealed this

Twenty-first Day of September, 2010

David J. Kappos
*Director of the United States Patent and Trademark Office*